United States Patent [19]

Kärnä et al.

[11] Patent Number: 5,037,671
[45] Date of Patent: Aug. 6, 1991

[54] PROCEDURE AND MEANS FOR MANUFACTURING STORAGE BATTERY PLATES

[75] Inventors: Toivo Kärnä, Porvoo; Frey Fredenberg, Mustio; Timo Niemi, Jyväskylä; Matti Luukka, Kangasniemi; Jukka-Pekka Nieminen, Porvoo, all of Finland

[73] Assignee: Neste Oy, Finland

[21] Appl. No.: 421,273

[22] Filed: Oct. 13, 1989

[51] Int. Cl.⁵ .................. B05C 1/00; B05D 5/12; B05D 7/22
[52] U.S. Cl. .................. 427/126.3; 118/221; 118/259; 118/407; 118/410; 427/126.6; 427/240; 427/287; 427/359; 427/428
[58] Field of Search .............. 427/428, 359, 126.3, 427/287, 126.6; 118/259, 248, 258, 407, 410, 221

[56] References Cited

U.S. PATENT DOCUMENTS

| | | | |
|---|---|---|---|
| 4,443,526 | 4/1984 | Jackovitz et al. | 427/126.6 |
| 2,565,036 | 8/1951 | MacDonald | 427/428 |
| 2,614,522 | 10/1952 | Snyder | 118/247 |
| 3,684,561 | 8/1972 | Labombarde | 427/428 |
| 3,859,135 | 1/1975 | Roberts | 427/46.3 |
| 4,004,288 | 12/1977 | Shah | 427/428 |
| 4,563,370 | 1/1986 | Menard | 427/126.3 |

Primary Examiner—Janyce Bell
Attorney, Agent, or Firm—Steinberg & Raskin

[57] ABSTRACT

In a method for manufacturing storage plates, plate frames (5) of storage batteries are material-coated by active material supply means which is provided with at least one rotating material application wheel. The wheel includes a dispensing element (14) with which the active material is dispensed to a conveyor belt or equivalent means which travels under the supply means (10) and conveys plate frames (5). The material application wheel/wheels (11,1a) of the supply means (10) is/are rotated at such a high speed that the material application wheel/wheels (11,1a) dispenses/dispense the active material (1) from the dispensing element (14) to the mobile conveyor belt (20) under the effect of centrifugal force. The invention also concerns a means for manufacturing storage batteries.

11 Claims, 2 Drawing Sheets

PROCEDURE AND MEANS FOR MANUFACTURING STORAGE BATTERY PLATES

BACKGROUND OF THE INVENTION

The present invention concerns a procedure for manufacturing storage batteries in which procedure a plate frame of storage battery plates is compound-applied with an active material applying apparatus. The apparatus includes at least one rotating compound application wheel provided with dispensing members for dispensing the active material on a conveyor belt of equivalent moving support. The belt travels under the application apparatus for conveying the active material to the plate frame.

The invention also concerns a device for manufacturing storage battery plates, the device comprising an active material application apparatus located above the conveyor belt, or equivalent moving support, for conveying the plate frames for storage battery plates. The material application apparatus includes at least one rotary compound applying wheel provided with dispensing members, the wheel being disposed when rotating to dispense the active material on the conveyor belt travelling thereunder.

The storage battery plates are in general manufactured in such manner that a plate blank, placed on a conveying base, e.g. on a belt, can receive active material which e.g. in a lead battery consists of lead oxide, water, sulphuric acid and requisite additives. For the lead battery, the plate frame has been formed of a lead wire reticle. The active material is compressed on the plate frame and is smoothed thereafter e.g. with the aid of rollers or equivalent. Thereafter, the storage battery plate is detached from the conveying base in an appropriate manner.

The active material is in nature claylike and sticky, which causes considerable problems in applying the compound on the plate frame. A means for applying the active compound is known in the art in which lead wire nets, that is, the plate frames, have been placed on a mobile conveyor belt which moves the plate frames past the active compound applying head. In the designs known in the art, a silo or equivalent has been disposed in the head applying the active compound. The head employs a rotary blade wheel, and an application roller thereunder applies the active compound on the plate frame passing under the silo.

However, the designs of the prior art have numerous drawbacks. A considerable drawback is that the dispensing with the blade wheel and with the application roller is inaccurate because the application roller does not permit dispensing an appropriate layer of the compound on a plate frame passing on the conveyor belt with sufficient accuracy. When passing under the silo, the plate frame has to "tear" the requisite layer of compound in place. This kind of design known in the prior art requires considerable and time-consuming subsequent cleaning of the storage battery plates as well as calibration of the completed storage battery plates to provide sufficiently homogenous plates. The mechanical strength of the plate frame is also required to be very high.

SUMMARY OF THE INVENTION

A primary object of the present invention is to provide a procedure and a means with which the disadvantages related to the state of the art are avoided, and with which an essential improvement as compared to the prior designs is achieved. For implementing this object, the method of the invention is characterized in the compound applying wheel/wheels of a supply means is/are rotated at a speed which so high that the compound application wheel/wheels dispenses/dispense the active material fed to the dispensing member on the mobile conveyor belt under the effect of centrifugal force.

The apparatus of the invention is in turn characterized in that the active material supply means is provided with an active material prefeeder for supplying the active material into the dispensing membrane when the compound application wheel is rotating. Furthermore, the compound application wheel is rotated at a speed sufficient to detach the active material from the dispensing member of the compound application wheel to land on the conveyor belt under the effect of centrifugal force.

Various advantages are achievable with the invention as may be seen from the following. Using the methodology and the apparatus of the invention, the active compound can be dispensed very accurately, this permitting the use of thinner and lighter plate frames than previously used. Due to the dispensing accuracy, trimming of the active material in the transversal direction of the storage battery plates is easy to carry out. Thereby the after cleaning of the storage battery plates is reduced as compared to the designs known in the art. Using the procedure and the apparatus of the invention, the active compound can be dispensed either in the form of a continuous or an intermittent band on a conveyor belt or equivalent moving support which travels under the active material supply means. The active material can be dispensed either directly on the belt or on the plate frames travelling on the belt.

Other advantages and characteristic features of the invention are disclosed in the detailed description of the invention following below.

BRIEF DESCRIPTION OF THE DRAWINGS

The invention is described in the following in detail referring to the Figures of the drawing enclosed whereas.

DETAILED DESCRIPTION

Figure 1:
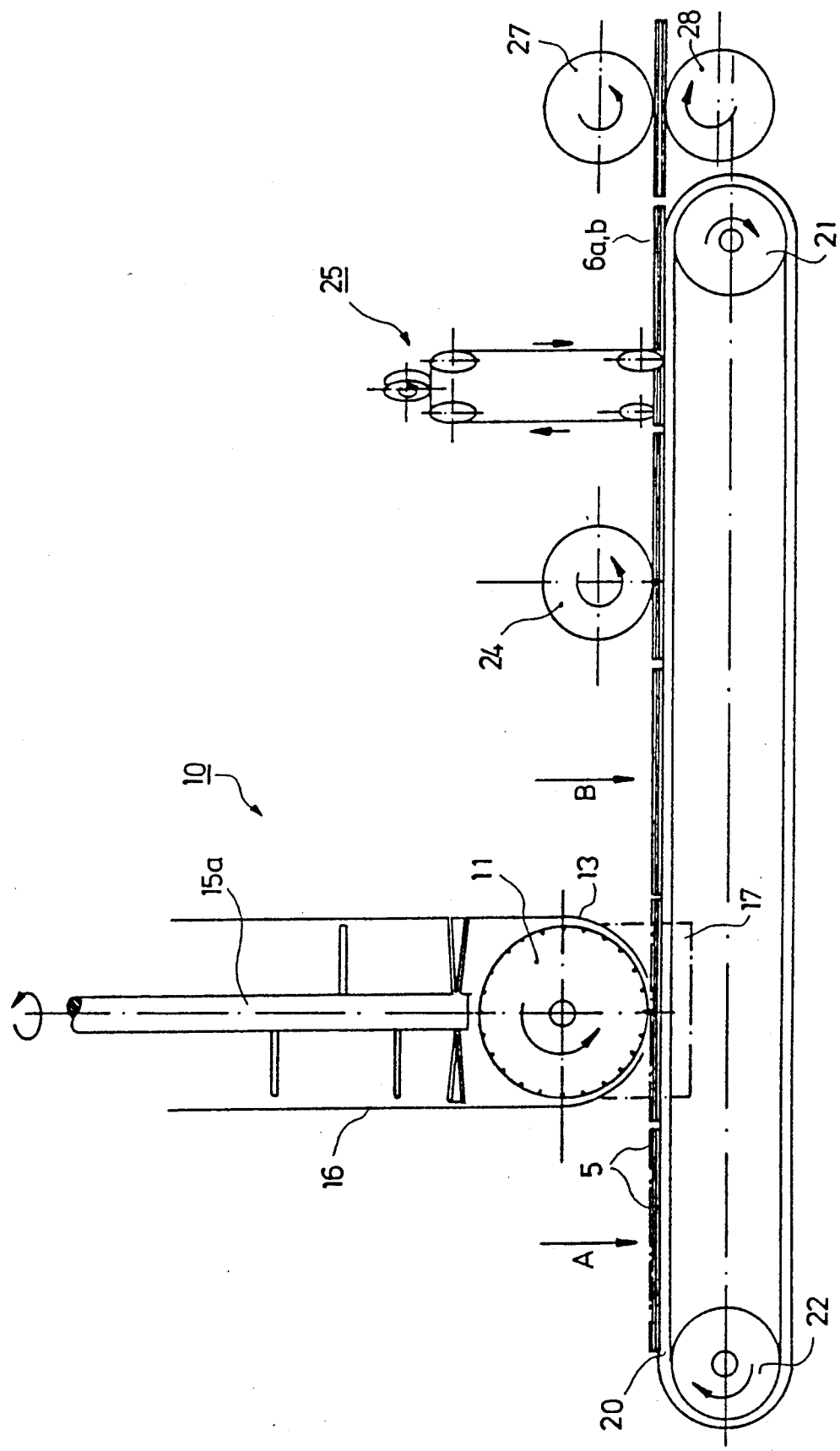
FIG. 1 presents schematically in elevational view an apparatus for producing storage battery plates.
Figure 2:
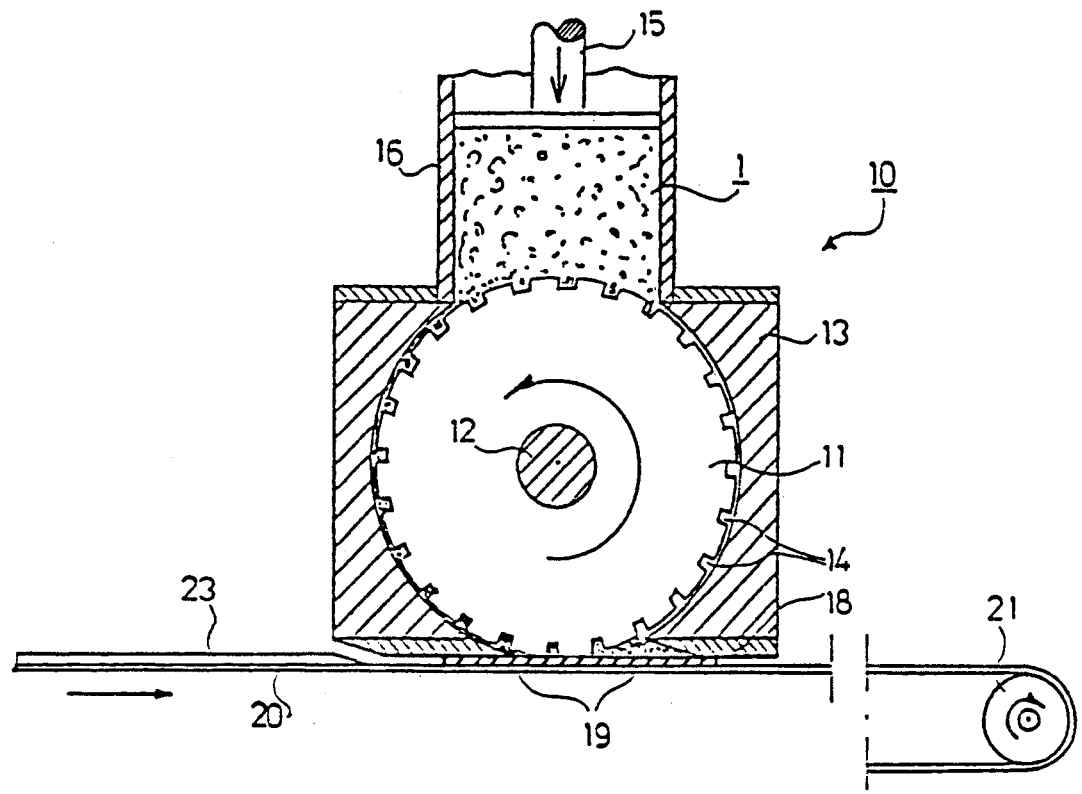
FIG. 2 present schematically in partial sectional image as viewed in parallel a supply means of the active material.

In FIG. 1, the supply means of the active material is in general indicated by reference numeral 10. The supply means 10 of the active material comprises a compound application wheel 11 (shown also in FIGS. 2 and 3) which is arranged to rotate in a material application wheel housing 13. Above the material application wheel 11 is disposed a prefeeder 15a in a housing 16, which in FIG. 2 is a screw dispenser. The prefeeder 15a feeds the active compound to the material application wheel 11 which in turn dispenses the active compound to a conveyor belt 20 travelling under the supply means 10. The conveyor belt 20 is an unending belt which travels above deflection sheaves 21 and 22, one of the deflection sheaves being selected to be a driving sheave.

In the arrangement of the invention, plate frames 5 may be fed to the conveyor belt 20, alternatively either before the active material supply means 10 at point A, or after the supply means at point B. If the plate frames 5 are fed to the conveyor belt 20 before the supply means 10 at point A, the material application wheel dispenses the active material directly on the plate frames 5. If the plate frames 5 are delivered to the conveyor belt 20 after the supply means 10 at point B, the supply means 10 dispenses the material directly on the conveyor belt 20, whereby the plate frames 5 are placed on top of the compound layer. When using the latter alternative, the plate frames 5 have to be pressed into the compound, which is performed with a rotary press roller 24 located after the dispensing point B. When using the first alternative, that is, when the plate frames 5 are delivered before the active material supply means 10 at point A, the press roller 24 is not necessarily required.

After the plate frames 5 have been compound-applied, the storage battery plates 6a,6b are detached from the conveyor belt 20, e.g. with the aid of a wire-type detaching means 25 shown in FIG. 1. The detaching means 25 is required because the active compound is extremely sticky and clay-like and adheres very easily to the conveyor belt 20. After detaching the storage battery plates, 6a,6b, the cleaning thereof, if needed, is carried out e.g. with the aid of pressurized air. Finally, after returning the plates to belt 20, the calibration of the finished battery storage plates 6a,6b is performed with the aid of calibration rollers 27 and 28 to the desired thickness.

Figure 3:
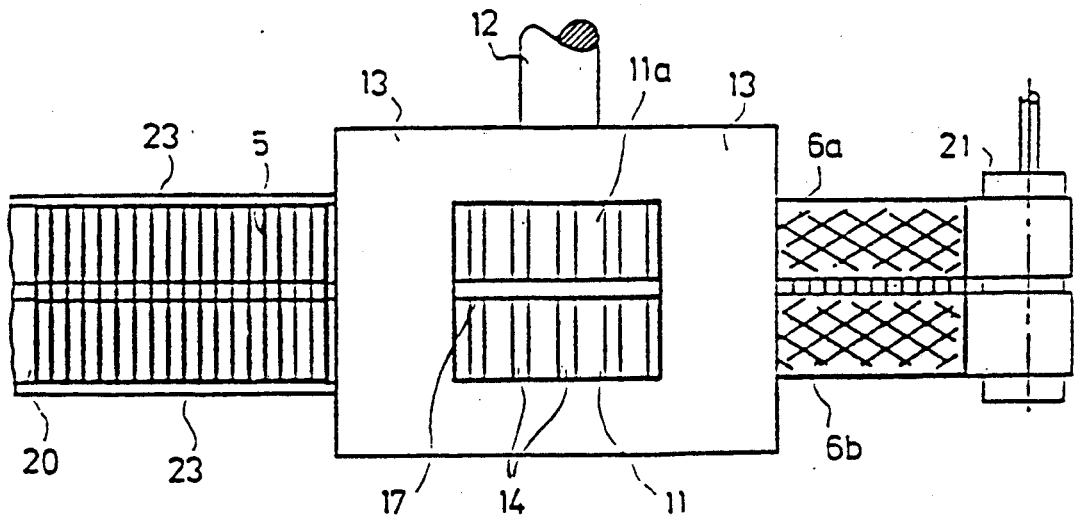
FIG. 3 shows schematically a top view of the supply means of FIG. 2.

In FIGS. 2 and 3, the structure and functioning of the active material supply means 10 is presented in a more close up. As is already mentioned above, the supply means 10 comprises at least one material application wheel 11,11a fitted to rotate in a wheel housing 13. The material application wheels 11,11a are mounted on a shaft 12 with which the wheels are driven. On the surface of the material application wheels there are arranged recesses 14, mainly in axial direction, the recesses being disposed on the wheel periphery at equal intervals in direction transverse of the shaft 12. Above the compound application wheel 11 a prefeeder 15 is disposed in a housing 16, said feeder pressing the active material 1 in the housing 16 into the recesses 14 in the material application wheel 11. Deviating from the embodiment of FIG. 1, the prefeeder 15 presented in FIG. 2 is a press dispenser in which a piston presses the active material 1 into recesses 14 of the material application wheel.

The material application wheel 11 is rotated at high speed, on the order of 1000 revolutions per minute. Therefore, the compound tends to detach from the recesses 14 located on the outer surface of the wheel. However, because the material application wheel 11 is on one hand surrounded by the active material 1, and on the other, by the wheel housing 13, the active material 1 may be detached from the wheel 11 only through an aperture 19 made on the under surface of the supply means 10, through which the material application wheel 11 dispenses active material either directly on the conveyor belt 20 or on the plate frames 5 carried upon the conveyor belt. The thickness of the compound layer introduced on the conveyor belt 20 or on the plate frames 5 can be regulated by adjusting the distance of the supply means 10 from the conveyor belt 20, and alternatively, by changing the speed of rotation of the material application wheel or wheels. In addition, on the trailing edge of the supply means 10 there is provided a smoothing plane 18 which smooths the upper surface of the compound layer dispensed on the conveyor belt 20.

It is described above that recesses 14, serving as dispensing elements, are formed on the surface of the material application wheels 11,11a. Dispensing elements may be formed on the material application wheel/wheels 11,11a also in other way; examples of such are ridges, grooves, peaks, bristles or equivalent formed on the material application wheel/wheels 11,11a.

As presented in FIG. 3, by using the procedure and the means of the invention it is possible to perform also the so-called material application of bipolar storage battery plates. The bipolar storage plates are such in which on the same plate frame are fitted both the so-called plus and minus compounds which are in separation from one another. For the material application of bipolar storage plates, there are arranged two material application wheels 11 and 11a on the same plate frame, separated by a partition from each other. Above this arrangement of supply means there are also been arranged two prefeeders separated by a wall. In the embodiment of FIG. 3, two parallel material application bands, with a gap therebetween, are in this manner disposed on the conveyor belt. If needed, the cleanliness of said gap after applying the compound is secured e.g. with the aid of the above described pressurized air blow. In addition, it is depicted in FIGS. 2 and 3 that before the dispensing means 10 side guides 23 are fitted on the conveyor belt 20 to insure that the plate frames 5 enter the dispensing means 10 in correct position.

As already described above, the plate frames 5 can be delivered to the conveyor belt 20 either before the dispensing means 10 at point A or after the same at point B. If the plate frames are delivered to the conveyor belt 20 before the dispensing means 10, the active material is dispensed directly on the plate frames 5. As a result, a given amount of stress is directed at the plate frames 5 from the supply means 10. However, it has been found in tests which have been carried out that the plate frames with about 1.2 mm wire thickness tolerate the stress caused by the supply means 10. Moreover, using the procedure and the means of the invention, the material application may be accomplished also on thinner plate frames. In the present instance, the plate frames 5 have to be delivered to the conveyor belt 20 after the supply means 10 at point B. Thereby the plate frames 5 are brought straight to the conveyor belt 20 on the top of the dispensed active material. Then the plate frames 5 have to be pressed into the active compound with the press roller 24 as described above.

The invention is described in the foregoing referring to the Figures presented in the drawing attached. Therewith, the invention is not intended to be confined to concern exclusively the embodiments shown in the Figures, it being understood that modifications may be feasible within the scope of the inventive concept as set forth in the following claims.

We claim:

1. A method for manufacturing storage batteries by use of material supply means disposed above a conveyor belt means, wherein plate frames of storage batteries are conveyed by the belt means and are coated with an active clay-like and sticky battery terminal forming material from the supply means, and the active material is dispensed by the supply means toward the belt means as the belt means travels beneath the supply means, wherein the supply means includes at least one rotating material application wheel having a plurality of dispensing elements spaced apart from each other along the circumferential periphery of said material application wheel by which the active material is dispensed toward the belt means, wherein the method comprises the steps of placing the active material into said dispensing element; and rotating said at least one material application wheel at a speed sufficiently high to dispense the active material from the dispensing elements of said at least one wheel to said belt means under the effect of centrifugal force.

2. A method according to claim 1 wherein said supply means further comprises a prefeeder, the method further comprising supplying the active material to said dispensing element of said wheel by the prefeeder.

3. A method according to claim 1 further comprising the steps of delivering the plate frames to said belt means at a location on a path of travel of said belt means before said supply means;

conveying the plate frames via said belt means to said supply means; and dispensing the active material by said supply means directly on the plate frames.

4. A method according to claim 1 further comprising the steps of dispensing the active material by said supply means directly on said belt means;

delivering the plate frames to said belt means on top of the active material at a location on a path of travel of said belt means after said supply means; and pressing the plate frames against the active material to coat said plate frame with said active material.

5. A method according to claim 1 further comprising the step of adjusting a spacing between said supply means and said belt means to select a thickness in layer of the active material.

6. A method according to claim 1 further comprising the step of adjusting a speed of rotation of said wheel to select a thickness in a layer of the active material.

7. A system for producing storage plates, said system comprising conveyor means;

a supply means for active clay-like and sticky battery terminal forming material, the supply means being located above the conveyor means, the conveyor means travelling beneath the supply means and conveying plate frames of storage battery plates; and wherein said supply means comprise at least one rotating material application wheel having a plurality of dispensing elements spaced apart from each other along the circumferential periphery of said material application wheel which are arranged to dispense the active material to said conveyor means, said supply means further comprising an active material prefeeder for discharging active material into said dispensing elements during rotation of said material application wheel and said material application wheel rotating at a speed sufficient to detach the active material from said dispensing elements of said wheel to said conveyor means under the effect of centrifugal force;

wherein said material supply means comprises a partition and at least two material application wheels arranged to rotate in parallel, said wheels being separated by said partition for dispensing active material to the conveyor belt means in two parallel strips.

8. A system according to claim 7, wherein said dispensing elements comprise indentation elements formed as recesses, ridges, grooves, peaks, or bristles, located on the periphery of said material application wheel.

9. A system according to claim 7 further comprising an additional material prefeeder, and wherein each material application wheel is provided with an individual, separate prefeeder.

10. A system according to claim 7 wherein said supply means is supported at an adjustable distance from the conveyor belt means for providing a thickness in a layer of the material on the conveyor belt means.

11. A system according to claim 7 wherein the speed of rotation of the material application wheel is adjustable.

* * * * *